US011651190B2

(12) United States Patent
Hoydis

(10) Patent No.: US 11,651,190 B2
(45) Date of Patent: May 16, 2023

(54) END-TO-END LEARNING IN COMMUNICATION SYSTEMS

(71) Applicant: NOKIA TECHNOLOGIES OY, Espoo (FI)

(72) Inventor: Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 254 days.

(21) Appl. No.: 16/757,560

(22) PCT Filed: Oct. 23, 2017

(86) PCT No.: PCT/EP2017/076964
§ 371 (c)(1),
(2) Date: Apr. 20, 2020

(87) PCT Pub. No.: WO2019/080987
PCT Pub. Date: May 2, 2019

(65) Prior Publication Data

US 2021/0192320 A1 Jun. 24, 2021

(51) Int. Cl.
*G06N 3/04* (2023.01)
*G06N 3/045* (2023.01)
(Continued)

(52) U.S. Cl.
CPC ........... *G06N 3/045* (2023.01); *G06F 18/217* (2023.01); *G06N 3/047* (2023.01); *G06N 3/063* (2013.01);
(Continued)

(58) Field of Classification Search
CPC ............. H04L 5/001; H04L 25/031165; H04L 25/497; G06N 3/0454; G06N 3/063; H06N 3/0472
See application file for complete search history.

(56) References Cited

U.S. PATENT DOCUMENTS

2011/0125684 A1 5/2011 Al-Duwaish et al.
2012/0281780 A1* 11/2012 Huang ................ H04B 7/0486 375/267
(Continued)

FOREIGN PATENT DOCUMENTS

CN 1731779 A 2/2006
CN 104618291 A 5/2015
(Continued)

OTHER PUBLICATIONS

Timothy J O'Shea et al.: "Deep Learning Based MIMO communications", arxiv.org, Cornell University Library, 201 Olin Library Cornell University Ithaca, NY 14853, Jul. 25, 2017 (Jul. 25, 2017), XP080779352, (Year: 2017).*
(Continued)

*Primary Examiner* — Brenda H Pham
(74) *Attorney, Agent, or Firm* — Squire Patton Boggs (US) LLP

(57) ABSTRACT

This specification relates to end-to-end learning in communication systems and describes: organising a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system; arranging a plurality of symbols of the multi-carrier transmission system into a plurality of transmit blocks; mapping each of said transmit blocks to one of the transmitter-receiver neural network pairs; transmitting each symbol using the mapped transmitter-receiver neural network pair; and training at least some weights of the transmit and receive neural networks using a loss function for each transmitter-receiver neural network pair.

20 Claims, 7 Drawing Sheets

(51) Int. Cl.

| | |
|---|---|
| ***G06N 3/063*** | (2023.01) |
| ***H04L 5/00*** | (2006.01) |
| ***H04L 25/03*** | (2006.01) |
| ***H04L 25/497*** | (2006.01) |
| ***G06F 18/21*** | (2023.01) |
| ***G06N 3/047*** | (2023.01) |

(52) U.S. Cl.

CPC ........ *H04L 5/001* (2013.01); *H04L 25/03165* (2013.01); *H04L 25/497* (2013.01)

(56) References Cited

U.S. PATENT DOCUMENTS

| | | | | |
|---|---|---|---|---|
| 2015/0249554 A1 | 9/2015 | Vaman et al. | | |
| 2017/0111916 A1 | 4/2017 | Corroy et al. | | |
| 2019/0191425 A1* | 6/2019 | Zhu | ...................... | H04B 7/0695 |
| 2020/0169311 A1* | 5/2020 | Ottersten | ............. | H04B 7/0695 |

FOREIGN PATENT DOCUMENTS

| | | |
|---|---|---|
| EP | 1 566 936 A1 | 8/2005 |
| EP | 2 538 553 A1 | 12/2012 |
| JP | 2012-503893 A | 2/2012 |
| JP | 2012-204910 A | 10/2012 |
| WO | 2010/013960 A2 | 2/2010 |

OTHER PUBLICATIONS

International Search Report & Written Opinion dated Jul. 11, 2018 corresponding to International Patent Application No. PCT/EP2017/076964.

Timothy J. O'Shea et al., "Deep Learning Based MIMO Communications," arxiv.org, Cornell University Library, Jul. 25, 2017, XP080779352.

Sebastian Dorner et al, "Deep Learning Based Communication Over the Air," Jul. 11, 2017, pp. 1-11, XP055487519, retrieved from https://arxiv.org/pdf/1707.03384.pdf.

Hao Ye et al., "Power of Deep Learning for Channel Estimation and Signal Detection in OFDM Systems," IEEE Wireless Communications Letters, vol. 7, No. 1, Aug. 28, 2017, pp. 1-4, XP055486957.

Cheng Chia-Hsin et al., "Neural Network-Based Estimation for OFDM Channels," 2014 IEEE 28th International Conference on Advanced Information Networking and Applications, IEEE, Mar. 24, 2015, pp. 600-604, XP032771878.

Necmi Taspinar et al., "Back Propagation neural network approach for channel estimation in OFDM system," Wireless Communications, Networking and Information Security (WCNIS), 2010 IEEE International Conference, IEEE, Jun. 25, 2010, pp. 265-268, XP031727434.

Examination Report dated Jul. 13, 2021 corresponding to Indian Patent Application No. 202017021052.

Notification of Reasons for Rejection (non-final) dated Sep. 1, 2021 corresponding to Japanese Patent Application No. 2020-523014, and English summary thereof.

Tim O'Shea et al, "An Introduction to Deep Learning for the Physical Layer," arXiv, Jul. 11, 2017, arxiv.org/pdf/1702.00832.pdf.

Korean Notice of Preliminary Rejection corresponding to KR Application No. 10-2020-7014710, dated May 26, 2022.

Japanese Office Action with English translation, corresponding to JP Application No. 2020-523014, dated Jul. 27, 2022.

Chinese Office Action corresponding to CN Application No. 201780097792.0, dated Feb. 18, 2023.

* cited by examiner

END-TO-END LEARNING IN COMMUNICATION SYSTEMS

FIELD

The present specification relates to learning in communication systems.

BACKGROUND

A simple communication system includes a transmitter, a transmission channel and a receiver. The design of such communication systems typically involves the separate design and optimisation of each part of the system. An alternative approach is to consider the entire communication system as a single system and to seek to optimise the entire system. Although some attempts have been made in the prior art, there remains scope for further improvements and implementations in this area.

SUMMARY

In a first aspect, this specification describes a method comprising: organising a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system; arranging a plurality of symbols of the multi-carrier transmission system into a plurality of transmit blocks; mapping each of said transmit blocks to one of the transmitter-receiver neural network pairs; transmitting each symbol using the mapped transmitter-receiver neural network pair; and training at least some weights of the transmit and receive neural networks using a loss function for each transmitter-receiver neural network pair. At least some weights of the transmit and receive neural networks may be trained using stochastic gradient descent. The loss function may be related to block error rate. The multi-carrier transmission system may be an orthogonal frequency division multiplexing system.

The method may further comprise mapping each symbol received at the plurality of receiver neural networks to generate an estimate of the transmitted symbols.

Each symbol may be transmitted from the transmitter neural network to the receiver neural network of the mapped transmitter-receiver neural network pair via a channel. The channel may be common to each of the plurality of transmitter and receiver neural network pairs. Furthermore, the channel may be a computational model.

The first aspect may further comprise optimising the mapping of each of said transmit blocks to the transmitter-receiver neural network pairs, for example using reinforcement learning.

The first aspect may further comprise interleaving of data bits across different symbols.

The first aspect may further comprise correcting carrier frequency offset using a carrier frequency offset neural network module. Alternatively, or in addition, the first aspect may comprise performing channel equalization using a channel equalization neutral network module.

In a second aspect, this specification describes an apparatus configured to perform any method as described with reference to the first aspect.

In a third aspect, this specification describes computer-readable instructions which, when executed by computing apparatus, cause the computing apparatus to perform any method as described with reference to the first aspect.

In a fourth aspect, this specification describes a computer-readable medium having computer-readable code stored thereon, the computer readable code, when executed by at least one processor, causing performance of: organising a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system; arranging a plurality of symbols of the multi-carrier transmission system into a plurality of transmit blocks; mapping each of said transmit blocks to one of the transmitter-receiver neural network pairs; transmitting each symbol using the mapped transmitter-receiver neural network pair; and training at least some weights of the transmit and receive neural networks using a loss function for each transmitter-receiver neural network pair.

In a fifth aspect, this specification describes an apparatus comprising: at least one processor; and at least one memory including computer program code which, when executed by the at least one processor, causes the apparatus to: organise a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system; arrange a plurality of symbols of the multi-carrier transmission system into a plurality of transmit blocks; map each of said transmit blocks to one of the transmitter-receiver neural network pairs; transmit each symbol using the mapped transmitter-receiver neural network pair; and train at least some weights of the transmit and receive neural networks using a loss function for each transmitter-receiver neural network pair.

In a sixth aspect, this specification describes an apparatus comprising: means for organising a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system; means for arranging a plurality of symbols of the multi-carrier transmission system into a plurality of transmit blocks; means for mapping each of said transmit blocks to one of the transmitter-receiver neural network pairs; means for transmitting each symbol using the mapped transmitter-receiver neural network pair; and means for training at least some weights of the transmit and receive neural networks using a loss function for each transmitter-receiver neural network pair.

BRIEF DESCRIPTION OF THE DRAWINGS

Example embodiments will now be described, by way of non-limiting examples, with reference to the following schematic drawings, in which.

DETAILED DESCRIPTION

Figure 1:
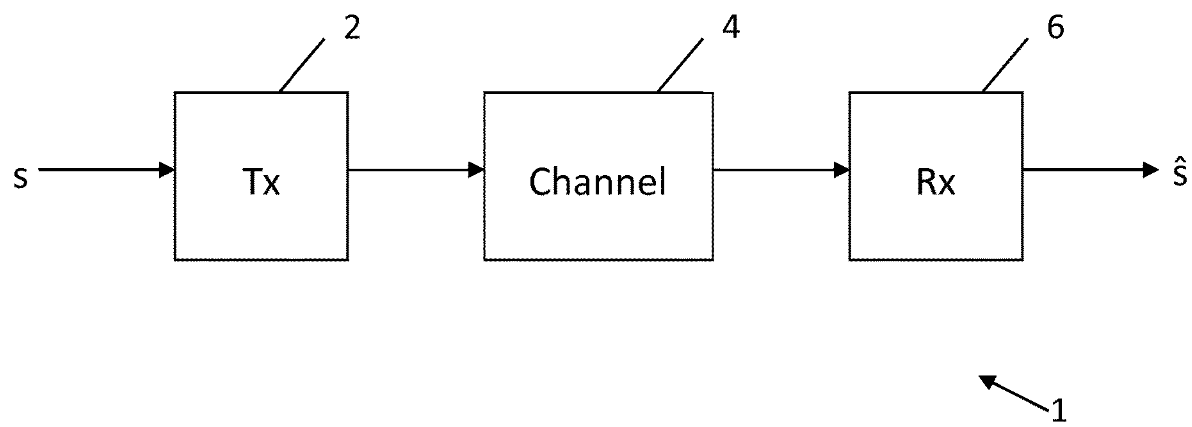
FIG. 1 is a block diagram of an exemplary communication system.

FIG. 1 is a block diagram of an exemplary communication system, indicated generally by the reference numeral 1. The communication system 1 comprises a transmitter 2, a channel 4 and a receiver 6. The transmitter 2 receives and encodes symbols s and transmits the encoded symbols to the receiver via the channel 4. The receiver 6 receives signals from the channel 4 and decodes the received symbols to provide decoded output symbols $\hat{s}$ that, in a perfect system, would be identical to the symbols s received at the transmitter.

By implementing the transmitter 2 and the receiver 6 using neural networks, the neural networks can be jointly trained in order to optimise the end-to-end performance of the system 1.

As shown in FIG. 1, the system 1 receives a transmitter input vector s. The input s is encoded by the transmitter 2. The neural network of the transmitter 2 is used to transform the input s into a signal for transmission using the channel 4. The neural network may include multiple layers (a so-called deep neural network). For example, the transmitter neural network may have some layers with weights that are trainable and some layers with weights that are fixed. Similarly, the receiver 6 is used to transform the output of the channel into the output $\hat{s}$. The neural network of the receiver 6 may include multiple layers (a so-called deep neural network). For example, the receiver neural network may have some layers with weights that are trainable and some layers with weights that are fixed.

In the context of a communication system, the outputs is typically the receiver's best guess of the input s. The receiver 6 may include a loss function that monitors how accurately the output $\hat{s}$ matches the inputs. The output of the loss function can then be used in training the weights of the neural network of the transmitter and/or the neural network of the receiver.

The present specification describes embodiments that extend the basic communication system 1 described above to multi-carrier transmissions, such as orthogonal frequency-division multiplexing (OFDM).

As typical for OFDM, we consider a frame of S OFDM symbols with N subcarriers. Such a frame consists hence of N. S complex-valued symbols in the frequency domain and is denoted by $X^{frame} \in \mathbb{C}^{N \times S}$. In the following, we describe a method of how to transmit and receive data over such a frame using neural networks (NNs).

We consider two collections of K≥1 neural networks, named $NN_k^{TX}$ and $NN_k^{RX}$ for k=1, . . . , K, respectively. These neural networks define the mappings $$NN_k^{TX}: \mathbb{M}_k \to \mathbb{C}^{n_k}, \mathbb{M}_k = \{0, \ldots, M_k - 1\}$$

$$NN_k^{RX}: \mathbb{C}^{n_k} \mapsto \left\{ x \in \mathbb{R}_+^{M_k} \middle| \sum_i x_i = 1 \right\}$$

In other words, $NN_{TX}^{k}$ maps an integer from the set $\mathbb{M}_k$ to an $n_k$-dimensional complex-valued vector, while $NN_k^{RX}$ maps an $n_k$-dimensional complex-valued vector to a probability vector over $M_k$ possible classes. We explain in FIG. 2 and FIG. 3, respectively, how these mappings can be implemented as neural networks.

In order to implement a multi-carrier transmission system (such as OFDM), the communication system of FIG. 1 is modified to provide multiple transmitters operating in parallel and multiple receivers operating in parallel (as described in detail below with reference to FIG. 5).

Figure 2:
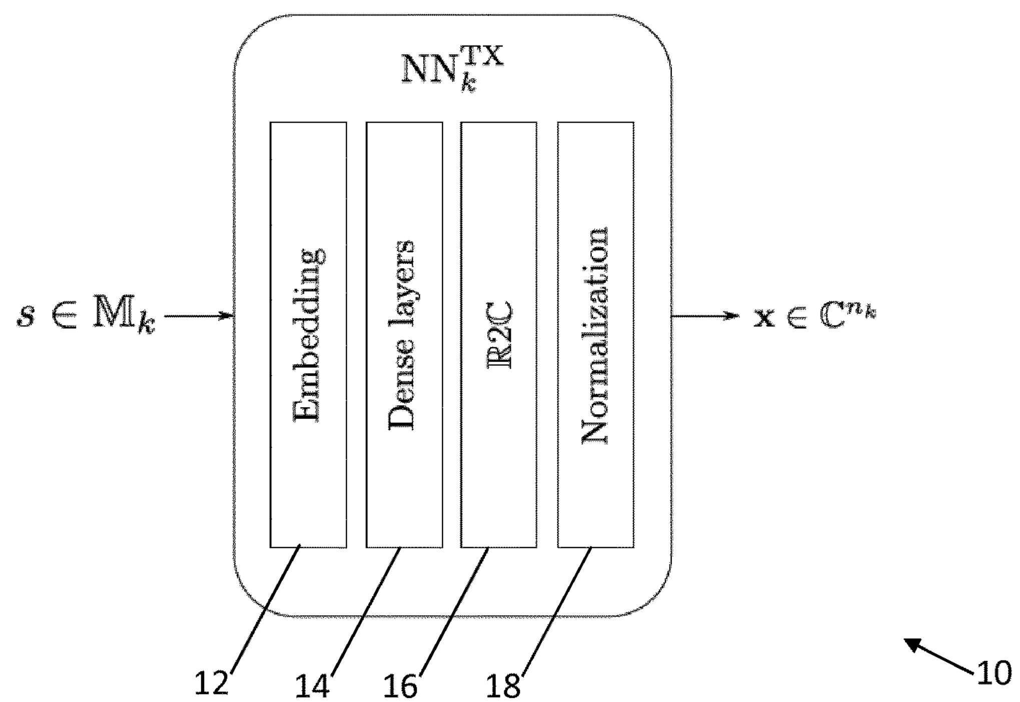
FIG. 2 is a block diagram of a transmitter that may be used in an exemplary implementation of the system of FIG. 1.

FIG. 2 is a block diagram of a transmitter, indicated generally by the reference numeral 10, that may be used as one of a number of parallel transmitter modules. The transmitter 10 is the kth transmitter of the plurality.

As shown in FIG. 2, the transmitter 10 receives an input s and provides an output vector x, where $s \in \mathbb{M}_k$ and $x \in \mathbb{C}^{n_k}$. The transmitter includes an embedding module 12, a dense layer of one or more neural networks 14, a complex vector generator 16 and a normalization module 18.

The input s is fed into the embedding module 22, embedding: $\mathbb{M} \to \mathbb{R}^{n_{emb}}$, that transforms s into an $n_{emb}$-dimensional real-valued vector.

The embedding layer 12 can optionally be followed by several dense neural network (NN) layers 14 with different possible activation functions, such as ReLU, sigmoid, tan h, linear etc. (also known as a multilayer perceptron (MLP)). The final layer of the neural network 14 has $2n_k$ output dimensions and a linear activation function. If no dense layer is used, $n_{emb}=2n$.

The output of the neural network 12 is converted to a complex-valued vector (by complex vector generator 16) through the mapping $\mathbb{R}2\mathbb{C}: \mathbb{R}^{2n_k} \to \mathbb{C}^{n_k}$, which could be implemented as $$\mathbb{R}2\mathbb{C}(z) = z_0^{n_k-1} + jz_{n_k}^{2n_k-1}.$$

A normalization is applied (in normalization module 18) that ensures that power, amplitude, or other constraints are met. The result of the normalization process is the transmit vector x of the transmitter 10 (where $x \in \mathbb{C}^{n_k}$). Note that the order of the complex vector generation and the normalization could be reversed.

Figure 3:
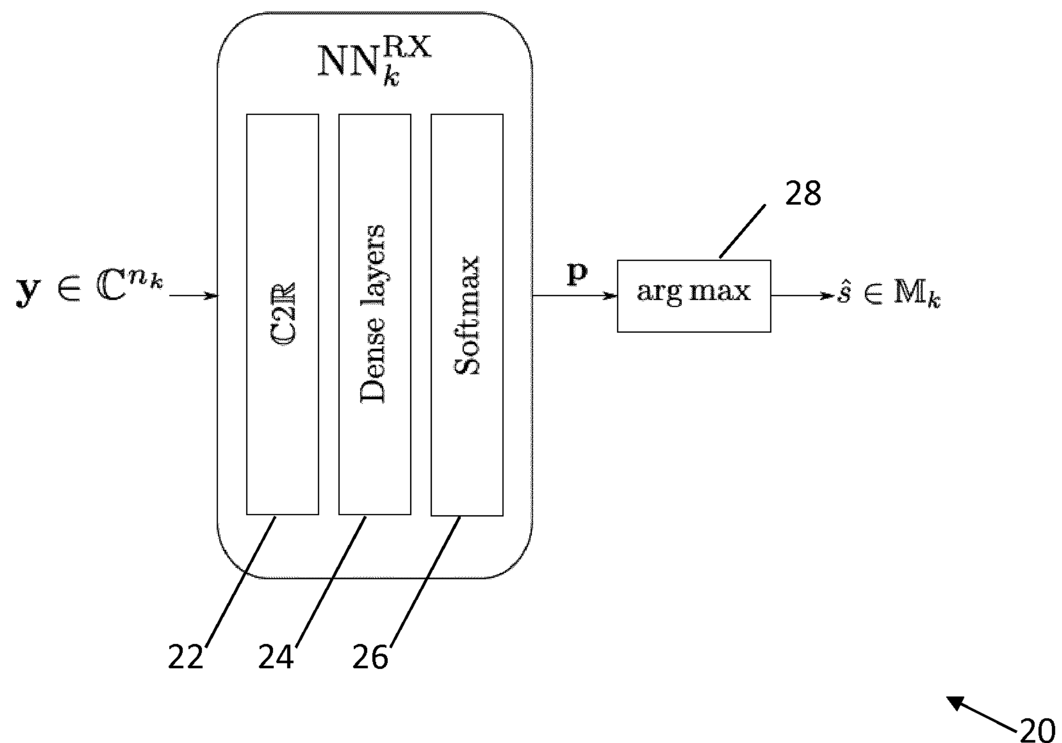
FIG. 3 is a block diagram of a receiver that may be used in an exemplary implementation of the system of FIG. 1.

FIG. 3 is a block diagram of a receiver, indicated generally by the reference numeral 20, that may be used as one of a number of parallel receiver modules. The receiver 20 is the kth receiver of the plurality. The output of the transmitter 10 is received at the receiver 20 via a channel (such as the channel 4 described above).

As shown in FIG. 3, the receiver 20 receives a vector y, where $y \in \mathbb{C}^{n_k}$ and provides an output $\hat{s} \in \mathbb{M}_k$. The receiver 20 includes a real vector generator 22, a dense layer of one or more neural networks 24, a softmax module 26 and an arg max module 28.

The received vector $y \in \mathbb{C}^{n_k}$ is transformed (by real vector generator 22) into a real-valued vector of $2n_k$ dimensions through the mapping $$\mathbb{C}2\mathbb{R}: \mathbb{C}^{n_k} \mapsto \mathbb{R}^{2n_k},$$

which could be implemented as $\mathbb{C}2\mathbb{R}(z)=[R\{z\}^T, J\{z\}^T]^T$ The result is fed into several dense neural network layers (the neural networks 24) with possibly different activation functions (e.g. ReLU, tan h, sigmoid, linear). The last layer has $M_k$ output dimensions to which a softmax activation is applied (by softmax module 26). This generates the probability vector $p \in \mathbb{R}^{M_k}$, whose elements $[p]_i$ can be interpreted as $Pr(s=i|y)$. A hard decision for the message is obtained as $\hat{s}=\arg\max(p)$ (by the arg max module 28).

Figure 4:
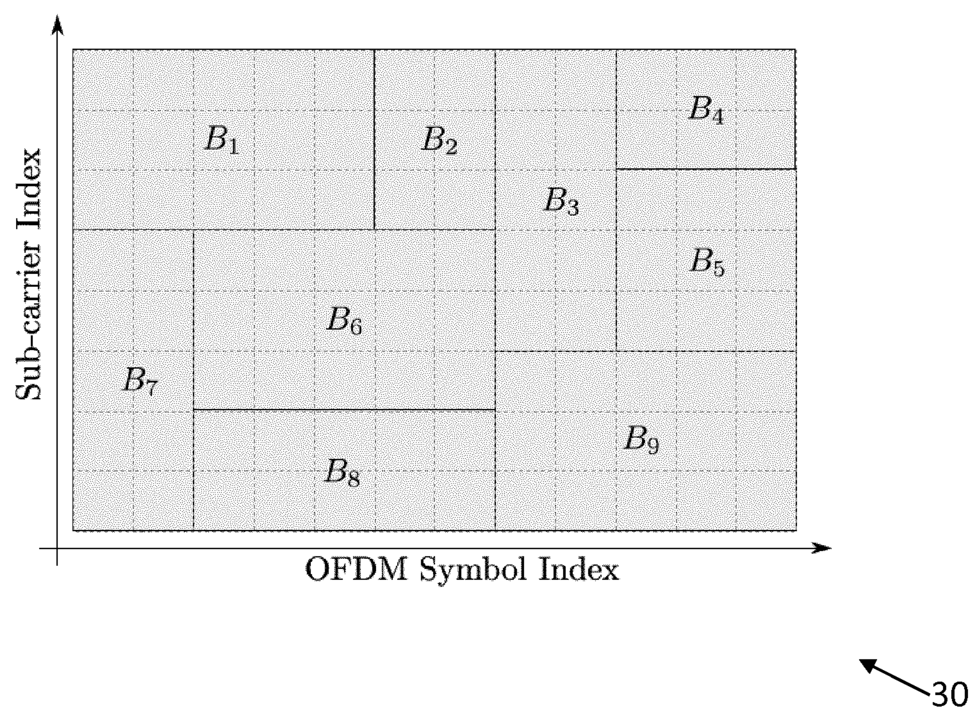
FIG. 4 shows an exemplary OFDM frame.

The frame is split into L transmit blocks $B_l$ for l=1, . . . , L, composed of $b_l$ symbols, respectively. Thus, the lth block can be defined as a set of $b_l$ subcarrier-symbol coordinates $$B_l=\{(N_1^l,S_1^l), \ldots, (N_{b_l}^l,S_{b_l}^l)\}$$

where $N_i^l \in [1,N]$ are subcarrier indices and $S_i^l \in [1,S]$ are OFDM symbol indices. FIG. 4 shows an exemplary OFDM frame, indicated generally by the reference numeral 30. The OFDM frame 30 shows a frame consisting of 12 OFDM symbols (S) with 8 sub-carriers (N) split into 9 transmit blocks ($B_1$ to $B_9$). Note that we require $b_l \in \{n_1, \ldots, n_K\}$ for l=1, . . . L. A block does not need to consist of adjacent symbols.

Figure 5:
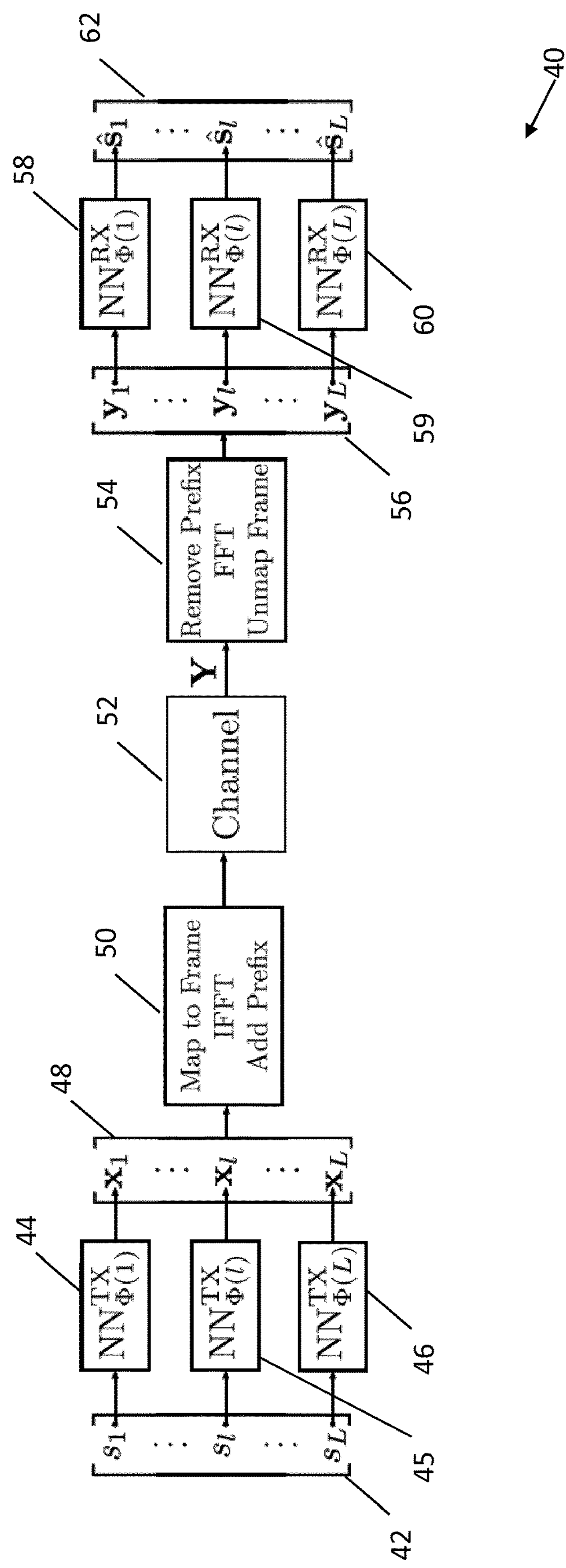
FIG. 5 is a block diagram of a multi-carrier transmission system in accordance with an exemplary embodiment.

FIG. 5 is a block diagram of a multi-carrier transmission system, indicated generally by the reference numeral 40, in accordance with an exemplary embodiment. The transmission system 40 comprises a transmitter input vector 42, a first transmitter neural network 44, a second transmitter neural network 45, a third transmitter neural network 46, a transmitter output vector 48, a mapping module 50, a channel 52, an unmapping module 54, a transmitter input vector 56, a first receiver neural network 58, a second receiver neural network 59, a third receiver neural network 60 and a receiver output vector 62. Although three transmitter and receiver neural networks are described above, it can be seen from FIG. 5 that there are L transmitter and receiver neural networks, not just three.

Each of the transmitter neural networks 44 to 46 may be implementations of the transmitter 10 described above. Similarly, each of the receiver neural networks 58 to 60 may be implementations of the receiver 20 described above.

The channel 52 may include a network that is used to model the transformations that would occur in a communications channel (e.g. noise, upsampling, filtering, convolution with a channel impulse response, resampling, time/frequency/phase offsets etc.). The network is typically a sequence of stochastic transformations of the input to the channel (i.e. the transmitter output vector 48). In general, the weights of the network implementing the channel mode are not trainable.

The channel model 52 could, in principle, be replaced with a real channel, but there are a number of practical advantages with using a channel model (such as not needing to set up a physical channel when training the neural networks of the system 40). Also, it is not straightforward to use a real channel here, since its transfer function is not known during training. A possible workaround is to use a two-stage training process where the system is first trained from end-to-end using a stochastic channel model and the only the receiver is fine-tuned based on real data transmissions. Other arrangements are also possible.

In the use of the system, the transmitter neural networks 44 to 46 and receiver neural networks 58 to 60 are organised into transmitter-receiver neural network pairs. For example, the first transmitter neural network 44 and the first receiver neural network 58 may form a first transmitter-receiver neural network pair, with blocks of data being sent from the first transmitter neural network 44 to the first receiver neural network 58 via the channel 52.

As noted above, the frame is split into L transmit blocks $B_l$ for l=1, . . . , L, composed of $b_l$ symbols, respectively. Thus, the lth block can be defined as a set of $b_l$ subcarrier-symbol coordinates $$B_l=\{(N_1^l,S_1^l), \ldots, (N_{b_l}^l,S_{b_l}^l)\}$$

where $N_i^l \in [1, N]$ are subcarrier indices and $S_i^l \in [1, S]$ are OFDM symbol indices.

We now define an arbitrary mapping $\Phi: \{1, \ldots, L\} \to \{1, \ldots, K\}$ that is such that $n_{\Phi(l)}=b_l$ for l=1, . . . , L. Using this mapping, we define a set of L inputs $\{s_1, \ldots, s_L\}$, where $s_l \in \mathbb{M}_{\Phi(l)}$. The mapping decides to which block each input will be mapped. Each input $s_l$ is now fed into the corresponding $NN_{\Phi(l)}^{TX}$ to produce its $b_l$-dimensional complex symbol representation $x_l \in \mathbb{C}^{b_l}$, i.e., $$x_l=NN_{\Phi(l)}^{TX}(s_l), l=1, \ldots, L$$

Next, the vectors $x_l$ are mapped to the frame $X^{frame}$ as $$[x^{frame}]_{N_i^l,S_i^l} = [x_l]_i,\ l = 1, \ldots, L,\ i = 1, \ldots, b_l$$

The frame is now transmitted according to a typical OFDM scheme, i.e., the N-point inverse discrete Fourier transform (IDFT) of each column of $X^{frame}$ is computed to which a cyclic or zero prefix of length P is added (see the mapping module 50 of FIG. 5). This results in the complex baseband time-domain representation of the frame that can be transmitted over the channel.

The channel 52 is represented as several computational layers that can simulate a multitude of hardware effects (e.g., quantization, clipping, automatic gain control (AGC), upsampling, filtering, resampling at another frequency (sampling frequency offset (SFO)), carrier frequency offset (CFO)) and propagation phenomena (e.g., addition of noise and/or interference, convolution with a random or deterministic channel impulse response). These channel layers typically have no trainable parameters.

At the receiver side, the received time-domain signal $Y \in \mathbb{C}^{(N+P)\times s}$ is converted (in unmapping module 54) to the frequency domain (after cyclic prefix removal via a column-wise N-point discrete Fourier transform (DFT). This results in the received frame $Y^{frame} \in \mathbb{C}^{N\times S}$.

The received symbols for each transmission block $y_l \in \mathbb{C}^{b_l}$ are extracted from $Y^{frame}$ as follows $$[y_l]_i = [Y^{frame}]_{N_i^l,S_i^l},\ i = 1, \ldots, b_l,\ l = 1, \ldots, L$$

The vector $y_l$ is fed into $NN_{\Phi(l)}^{RX}$ to produce the probability vector $p_l \in \mathbb{R}_+^{b_l}$ whose ith element can be interpreted as $Pr(s_l=i|y)$. The estimate $\hat{s}_l$ of the transmitted message on the lth block is hence $$\hat{s}_l=\arg\max(p_l)=\arg\max(NN_{\Phi(l)}^{RX}(y_l))$$

The system 40 is used to provide end-to-end learning in multi-carrier communication systems, such as orthogonal frequency division multiplexing (OFDM) or similar systems. As described in detail below, the transmitter neural networks 44 to 46 and the receiver neural networks 58 to 60 are trained in order to optimise the performance of the system 40.

Training a neural network refers to updating the parameters (or weights) of the neural network so that, given particular inputs, the network's outputs becomes closer to some desired corresponding values. In order to do this, we first need some measure of how close the network's output and the desired value are. This measure is typically defined as a loss function L which accepts the desired and outputted values, and returns their difference according to some measure. This difference is known as the loss. A loss of zero typically represents no difference between the desired and optimal values with greater values indicating greater differences. We can now restate neural network training as updating the parameters so as to minimise the loss.

In the vast majority of cases, we cannot find these parameters with a closed form solution and have to employ an iterative method such as gradient descent. Gradient descent uses the observation that, at a given point, updating the parameters in the opposite direction to the gradient of the loss function with respect to these parameters will lead to the greatest reduction in loss. After the parameters have been updated, the gradient is recalculated and this is repeated until convergence, when the loss value is no longer decreasing significantly with each iteration, or until some user specified iteration limit. Traditional, or batch, gradient descent calculates this gradient using the loss over all given inputs and desired values, on each iteration. Analysing the entire sample on each iteration is very inefficient and so convergence would take a relatively long time. Instead, most neural networks are trained using a procedure known as stochastic gradient descent (SGD). SGD estimates the gradient using a single or small number of input and desired value pair(s) on each iteration. In most scenarios, SGD reaches convergence much faster while still finding suitable parameter values.

Assume that there are K neural network (NN) transmitter-receiver pairs $NN_k^{TX}$ and $NN_k^{RX}$, where k=1, 2 . . . K. The K neural network transmitter-receiver pairs can be trained via stochastic gradient descent using the following loss function:

$$L = -\sum_{l=1}^{L} \alpha_l \log([y_l]_{s_l})$$

where $\alpha_l \in \mathbb{R}_+$ for l=1, . . . , L are positive weight factors and $-\log([p_l]_{s_l})$ is the (sparse) categorical cross entropy between $s_l$ and $p_l$.

The training of the K neural network transmitter-receiver pairs can be implemented as follows:

Fix N, S, K as well as the dimensions $n_1, \ldots, n_K$.

Initialize the weights and biases of the layers of $NN_k^{TX}$ and $NN_k^{RX}$ for k=1, . . . , K.

Repeat as long as desired:

- Choose a random L form a set of possible values and split the frame into L blocks (according to some possible probabilistic scheme) such that $b_l \in \{n_1, \ldots, n_K\}$ for l=1, . . . , L.
- Choose a mapping $\Phi$ satisfying $n_{\Phi(l)} = b_l$ for l=1, . . . , L.
- Generate random messages $s_l \in \mathbb{M}_{\Phi(l)}$.
- Transmit and receive the messages over a random channel realization as described above.
- Compute the loss L and apply a SGD step to update the weights of $NN_{\Phi(l)}^{TX}$ and $NN_{\Phi(l)}^{RX}$ for l=1, . . . , L.

Figure 6:
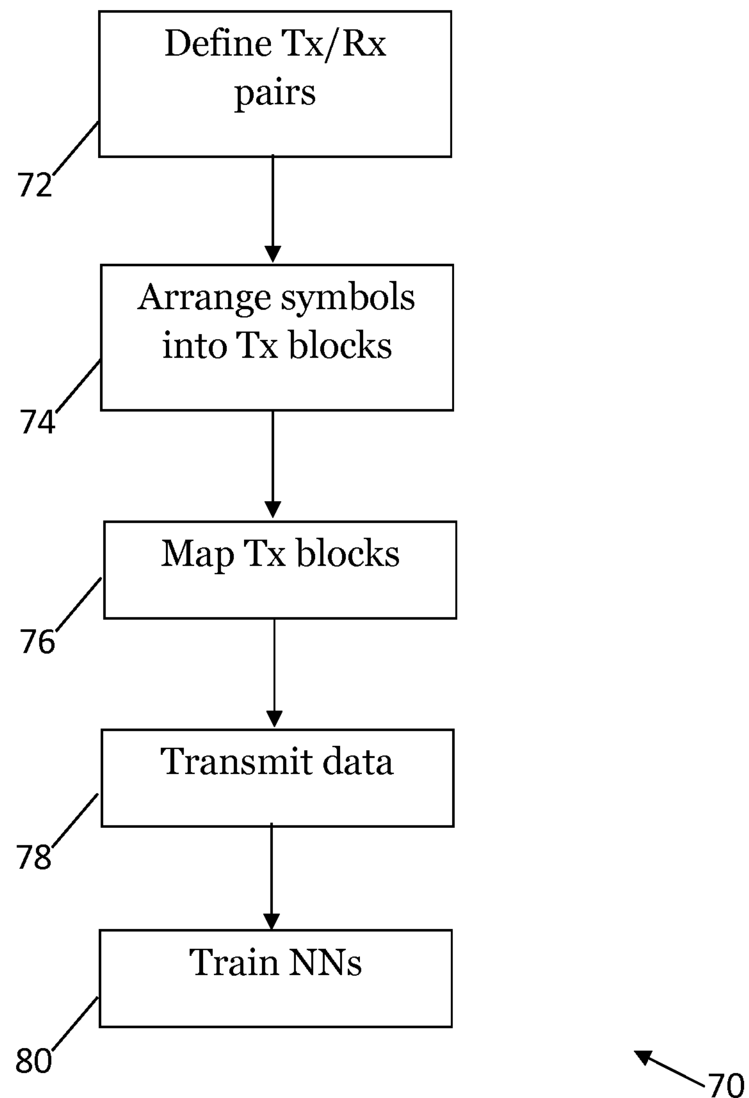
FIG. 6 is a flow chart showing an exemplary use of the system of FIG. 5.

FIG. 6 is a flow chart showing an algorithm, indicated generally by the reference numeral 70, showing an exemplary use of the system of FIG. 5.

The algorithm 70 starts at operation 72, where the transmitter neural networks 44 to 46 and the receiver neural networks 58 to 60 are organised into transmitter-receiver neural network pairs.

Next, at operation 74, the symbols for transmission are arranged into transmit blocks. The transmit blocks are mapped to transmitter-receiver neural network pairs (operation 76). The way in which a frame of data is split into blocks and/or the mapping of the blocks to the transmitter-receiver pairs can vary over time. This may be dependent, for example, on information available at the transmitter (e.g. channel state information) and/or on feedback from the receiver. In this case, the mapping function described above as $\Phi(l)$ may be expressed as $\Phi(l, t, \Theta)$ where t is a time index and $\Theta$ is a vector of additional parameters.

The mapping $\Phi(l)$ determines which neural network is used for transmission of a block and thus defines the constellation and rate that is used. For example, the rate of $NN_k^{TX}$ is $\log_2(M_k)/n_k$ bits/channel use. This is similar to adaptive coding and modulation (ACM) in traditional communications systems.

With the symbols mapped to transmitter-receiver pairs, the algorithm moves to operation 78 where the symbols are transmitted via the channel 52. In this way, each transmitter-receiver pair ($NN_k^{TX}$ and $NN_k^{RX}$), together with the channel, forms an autoencoder that can be optimised.

With the symbols transmitted (operation 78) and received at the receivers of the transmitter-receiver neural network pairs, the respective transmitter and receiver neural networks can be trained (operation 80), thereby providing end-to-end learning for each transmitter-receiver neural network pair.

As described above, each of the transmitter-receiver pairs form an autoencoder that can be optimised through training. It is also possible to optimise the mapping function $\Phi(l)$ in a similar way based on feedback from the receiver (e.g. success/failure of decoding), for example using reinforcement learning.

Each message $s_l$ can be mapped to a binary vector of length $\log_2(M_{\Phi}(l))$. The bits representing one message can be interleaved over multiple frames or multiple transmit blocks. This increases diversity hence robustness to fading.

Some of the embodiments described above make use of stochastic gradient descent (SGD). In many known uses, SGD is carried out on mini-batches of messages. This principle can also be applied to the embodiments described herein.

In some embodiments, some of the symbols in a frame may be reserved for transmission of other data, such as pilot tones which can be leveraged, for example, for channel estimation and/or carrier frequency offset (CFO) estimation.

Figure 7:
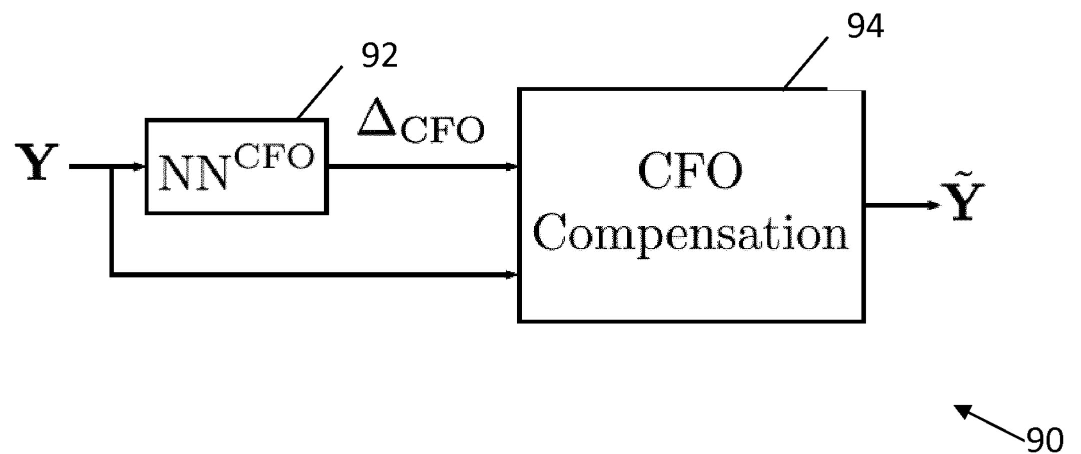
FIG. 7 is a block diagram showing an exemplary carrier frequency offset module.

FIG. 7 is a block diagram showing an exemplary carrier frequency offset (CFO) module, indicated generally by the reference numeral 90. As shown in FIG. 7, the exemplary CFO module 90 comprises a CFO neural network 92 and a CFO compensation module 94.

CFO is a hardware imperfection that can have a strong impact on OFDM or similar schemes, since CFO can destroy the orthogonality between sub-carriers. As shown in FIG. 7, we propose here to estimate the CFO $\Delta_{CFO} \in \mathbb{R}$ with another neural network, called $NN^{CFO}$, based on the received time-domain signal Y. $NN^{CFO}$, which can be any type of neural network, outputs a real scalar for the input Y (or a vectorized version of it). The parameter $\Delta_{CFO} \in \mathbb{R}$ is then fed into an CFO compensation algorithm to produce the compensated time-domain signal to produce the compensated time-domain signal $\tilde{Y}$ which is used for frame extraction and decoding. Such an algorithm could work as follows: Let $y=\text{vec}(Y) \in \mathbb{C}^{(N+P)S}$ is given as $$[\tilde{y}]_i=[y]_i e^{-ji\Delta_{CFO}}, i=1, \ldots, (N+P)S$$

The CFO estimation and compensation procedure can be integrated into the end-to-end learning process. Rather than estimating the CFO, it is possible to estimate a complex scalar, say $f$, and carry out the compensation function $[\tilde{y}]_i=[y]_i f^i$.

Notice that the CFO estimation relies on the entire frame which is generated by multiple and possible changing neural networks. Having pilot tones at fixed locations within the frame can be helpful. Note that also any other traditional algorithm for CFO estimation/compensation can be used, as long as it can be represented as neural network layers, i.e., a deterministic and differentiable function.

Figure 8:
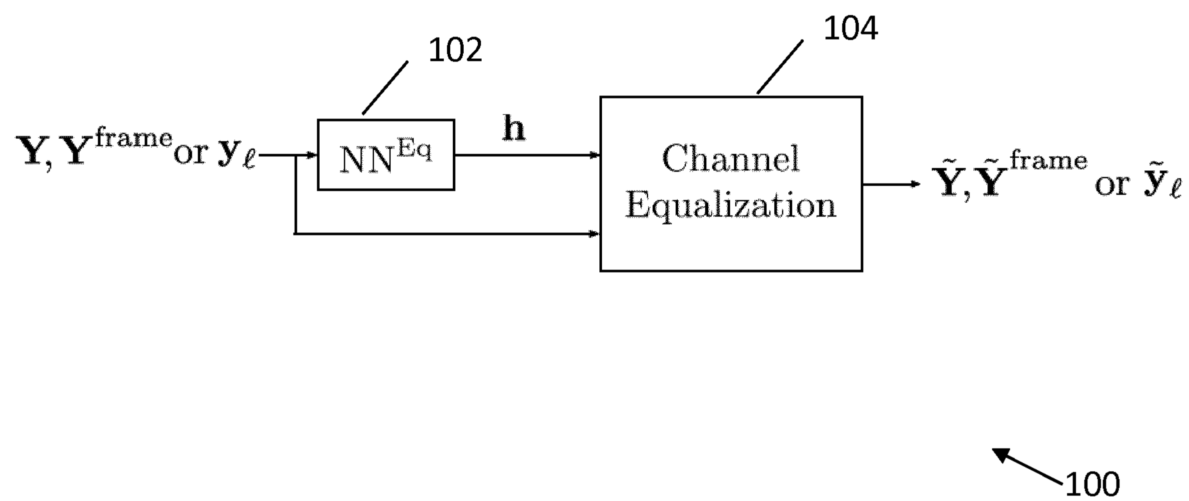
FIG. 8 is a block diagram of an exemplary channel equalization module.

FIG. 8 is a block diagram of an exemplary channel equalization module, indicated generally by the reference numeral 100. As shown in FIG. 8, the exemplary channel equalization module 100 comprises a channel equalization neural network 102 and a channel equalization module 104.

Similar to the CFO compensation described above, we propose a method for channel equalization that makes use of the neural network 102 to estimate a complex-valued vector h from the observation Y or $Y^{frame}$. This vector is used by a deterministic channel equalization algorithm to produce the equalized output $\hat{Y}$ or $\hat{Y}^{frame}$. For example, h can be interpreted as the inverse time-domain channel impulse response or the frequency-domain sub-carrier channel coefficients. Depending on this interpretation the channel equalization block either computes a convolution of Y with h or multiplies the nth row of $Y^{frame}$ by $N_n^*/|h_n|$.

In a similar manner to the CFO compensation described above, the channel equalization procedure can be integrated into the end-to-end training process.

Of course, a particular implementation may incorporate both the CFO module 90 and the channel equalisation module 100.

The specification has generally described applications that make use of orthogonal frequency division multiplexing (OFDM). This is not essential to all implementations. Some implementations may be considered to be modified OFDM systems. Other implementations may be multi-carrier communication systems that are not OFDM or modified OFDM systems.

Figure 9:
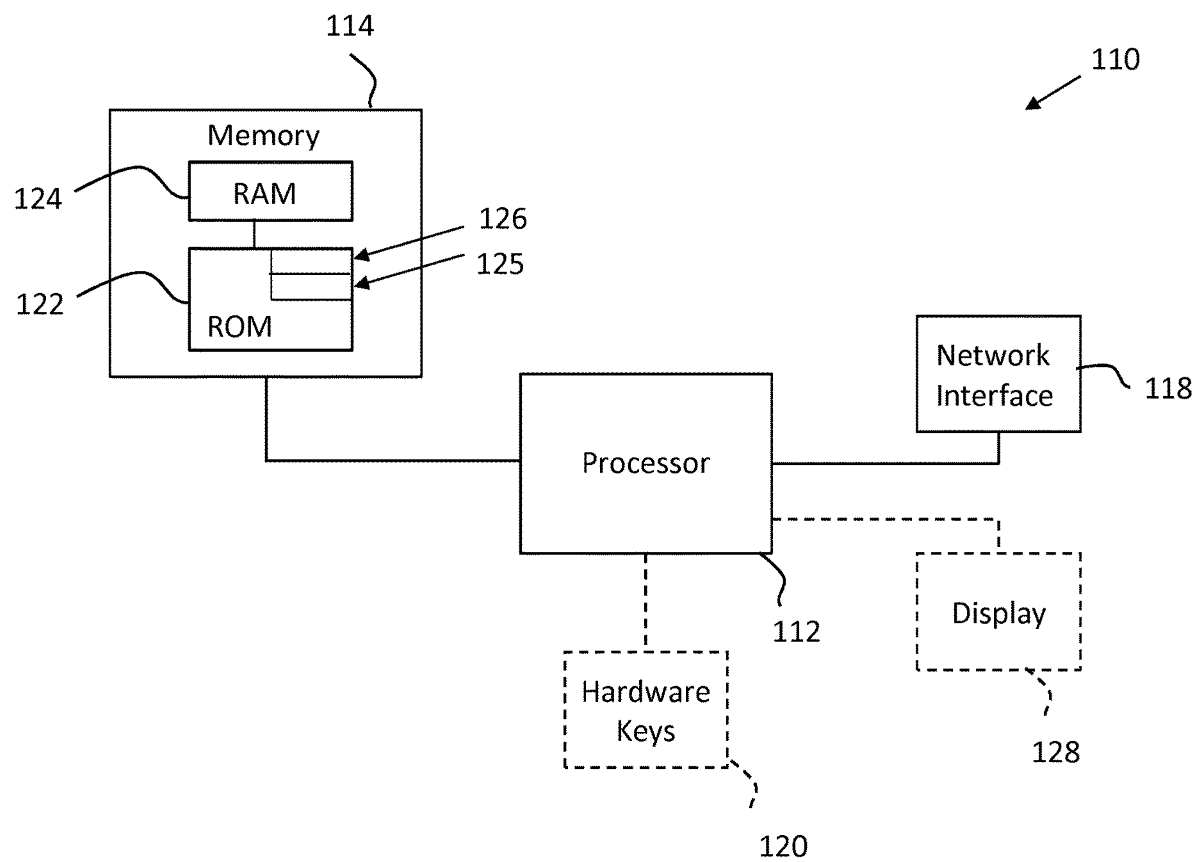
FIG. 9 is a block diagram, of components of a processing system in accordance with an exemplary embodiment.

For completeness, FIG. 9 is a schematic diagram of components of one or more of the modules described previously (e.g. the transmitter or receiver neural networks), which hereafter are referred to generically as processing systems 110. A processing system 110 may have a processor 112, a memory 114 closely coupled to the processor and comprised of a RAM 124 and ROM 122, and, optionally, hardware keys 120 and a display 128. The processing system 110 may comprise one or more network interfaces 118 for connection to a network, e.g. a modem which may be wired or wireless.

The processor 112 is connected to each of the other components in order to control operation thereof.

The memory 114 may comprise a non-volatile memory, a hard disk drive (HDD) or a solid state drive (SSD). The ROM 122 of the memory 114 stores, amongst other things, an operating system 125 and may store software applications 126. The RAM 124 of the memory 114 is used by the processor 112 for the temporary storage of data. The operating system 125 may contain code which, when executed by the processor, implements aspects of the algorithm 70.

The processor 112 may take any suitable form. For instance, it may be a microcontroller, plural microcontrollers, a processor, or plural processors.

The processing system 110 may be a standalone computer, a server, a console, or a network thereof.

In some embodiments, the processing system no may also be associated with external software applications. These may be applications stored on a remote server device and may run partly or exclusively on the remote server device. These applications may be termed cloud-hosted applications. The processing system 110 may be in communication with the remote server device in order to utilize the software application stored there.

Figure 10:
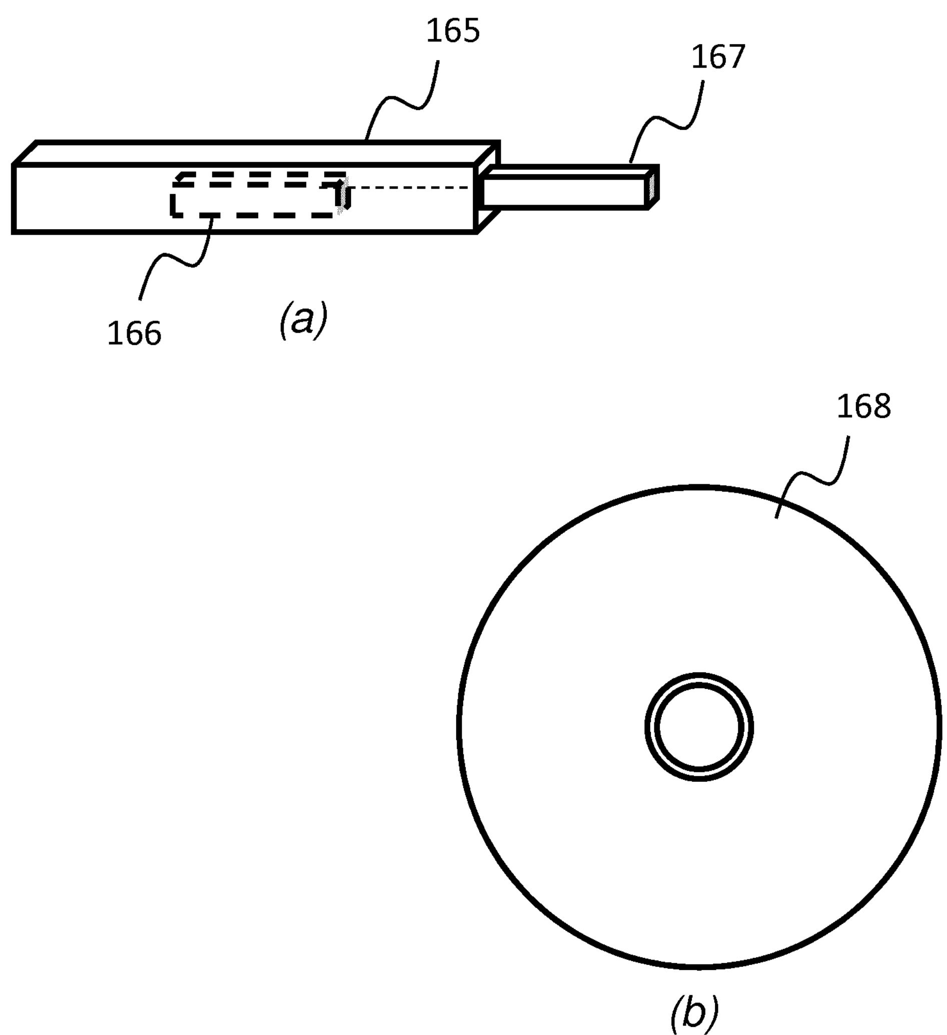
FIGS. 10*a* and 10*b* show tangible media, respectively a removable memory unit and a compact disc (CD) storing computer-readable code which when run by a computer perform operations according to embodiments.

FIGS. 10*a* and 10*b* show tangible media, respectively a removable memory unit 165 and a compact disc (CD) 168, storing computer-readable code which when run by a computer may perform methods according to embodiments described above. The removable memory unit 165 may be a memory stick, e.g. a USB memory stick, having internal memory 166 storing the computer-readable code. The memory 166 may be accessed by a computer system via a connector 167. The CD 168 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 6 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method, comprising:

organizing a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system;

configuring a plurality of symbols of the multi-carrier transmission system into a plurality of transmit blocks;

mapping each of said transmit blocks to one of the transmitter-receiver neural network pairs;

transmitting each symbol using the mapped transmitter-receiver neural network pair;

training at least some weights of the transmit and receive neural networks using a loss function for each transmitter-receiver neural network pair; and correcting carrier frequency offset, based on a received time-domain signal corresponding to the plurality of transmitted symbols, using a carrier frequency offset neural network module, wherein the carrier frequency offset neural network is trained in an integrated way with each of the transmitter-receiver neural network pairs.

2. The method as claimed in claim 1, further comprising mapping each symbol received at the plurality of receiver neural networks to generate an estimate of the transmitted symbols.

3. The method as claimed in claim 1, wherein said at least some weights of the transmit and receive neural networks are trained using stochastic gradient descent.

4. The method as claimed in claim 1, wherein the loss function is related to block error rate.

5. The method as claimed in claim 1, wherein each symbol is transmitted from the transmitter neural network to the receiver neural network of the mapped transmitter-receiver neural network pair via a channel.

6. The method as claimed in claim 5, wherein said channel is common to each of the plurality of transmitter and receiver neural network pairs.

7. The method as claimed in claim 1, further comprising optimizing the mapping of each of said transmit blocks to the transmitter-receiver neural network pairs.

8. The method as claimed in claim 7, wherein the mapping of each of said transmit blocks is optimized using reinforcement learning.

9. The method as claimed in claim 1, further comprising interleaving of data bits across different symbols.

10. The method as claimed in claim 1, further comprising performing channel equalization using a channel equalization neutral network module.

11. The method as claimed in claim 1, wherein the multi-carrier transmission system comprises an orthogonal frequency division multiplexing system.

12. A non-transitory computer-readable medium having computer-readable code stored thereon, the computer readable code, when executed by at least one processor, causes of the processor to perform a process, comprising:

organizing a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system;

configuring a plurality of symbols of the multi-carrier transmission system into a plurality of transmit blocks;

mapping each of said transmit blocks to one of the transmitter-receiver neural network pairs;

transmitting each symbol using the mapped transmitter-receiver neural network pair;

training at least some weights of the transmit and receive neural networks using a loss function for each transmitter-receiver neural network pair; and correcting carrier frequency offset, based on a received time-domain signal corresponding to the plurality of transmitted symbols, using a carrier frequency offset neural network module, wherein the carrier frequency offset neural network is trained in an integrated way with each of the transmitter-receiver neural network pairs.

13. An apparatus, comprising:

at least one processor; and at least one memory including computer program code;

the at least one memory and computer program code being configured to, with the at least one processor, cause the apparatus at least to:

organize a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system;

configure a plurality of symbols of the multi-carrier transmission system into a plurality of transmit blocks;

map each of said transmit blocks to one of the transmitter-receiver neural network pairs;

transmit each symbol using the mapped transmitter-receiver neural network pair;

train at least some weights of the transmit and receive neural networks using a loss function for each transmitter-receiver neural network pair;

correct carrier frequency offset, based on a received time-domain signal corresponding to the plurality of transmitted symbols, using a carrier frequency offset neural network module; and train the carrier frequency offset neural network in an integrated way with each of the transmitter-receiver neural network pairs.

14. The apparatus according to claim 13, wherein the memory and the computer program code are further configured, with the at least one processor, to cause the apparatus to map each symbol received at the plurality of receiver neural networks to generate an estimate of the transmitted symbols.

15. The apparatus according to claim 13, wherein the at least one memory and computer program code are further configured to, with the at least one processor, cause the apparatus to train said at least some weights of the transmit and receive neural networks using stochastic gradient descent.

16. The apparatus according to claim 13, wherein the loss function is related to block error rate.

17. The apparatus according to claim 13, wherein the at least one memory and computer program code are further configured to, with the at least one processor, cause the apparatus to transmit each symbol from the transmitter neural network to the receiver neural network of the mapped transmitter-receiver neural network pair via a channel.

18. The apparatus according to claim 17, wherein said channel is common to each of the plurality of transmitter and receiver neural network pairs.

19. A method, comprising:

organizing a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system;

configuring a plurality of symbols of the multi-carrier transmission system into a plurality of transmit blocks;

mapping each of said transmit blocks to one of the transmitter-receiver neural network pairs;

transmitting each symbol using the mapped transmitter-receiver neural network pair;

training at least some weights of the transmit and receive neural networks using a loss function for each transmitter-receiver neural network pair; and performing channel equalization, based on a received time-domain signal corresponding to the plurality of transmitted symbols, using a channel equalization neutral network module, wherein the channel equalization neural network is trained in an integrated way with each of the transmitter-receiver neural network pairs.

20. An apparatus, comprising:

at least one processor; and at least one memory including computer program code;

the at least one memory and computer program code being configured to, with the at least one processor, cause the apparatus at least to:

organize a plurality of transmitter neutral networks and a plurality of receiver neural networks into a plurality of transmitter-receiver neural network pairs, wherein a transmitter-receiver neural network pair is defined for each of a plurality of subcarrier frequency bands of a multi-carrier transmission system;

configure a plurality of symbols of the multi-carrier transmission system into a plurality of transmit blocks;

map each of said transmit blocks to one of the transmitter-receiver neural network pairs;

transmit each symbol using the mapped transmitter-receiver neural network pair;

train at least some weights of the transmit and receive neural networks using a loss function for each transmitter-receiver neural network pair;

perform channel equalization, based on a received time-domain signal corresponding to the plurality of transmitted symbols, using a channel equalization neutral network module; and train the channel equalization neural network in an integrated way with each of the transmitter-receiver neural network pairs.

* * * * *